(12) United States Patent
Vignoli

(10) Patent No.: US 7,703,497 B2
(45) Date of Patent: Apr. 27, 2010

(54) TYRE MOUNTING/DISMOUNTING MACHINE

(75) Inventor: Giuliano Vignoli, Modena (IT)

(73) Assignee: Societa Italiana Costruzioni Elettromeccaniche S.I.C.E. S.p.A., Correggio (IT)

( * ) Notice: Subject to any disclaimer, the term of this patent is extended or adjusted under 35 U.S.C. 154(b) by 140 days.

(21) Appl. No.: 12/013,202

(22) Filed: Jan. 11, 2008

(65) Prior Publication Data
US 2008/0173408 A1 Jul. 24, 2008

(30) Foreign Application Priority Data
Jan. 18, 2007 (IT) .......................... RE2007A0007

(51) Int. Cl.
*B60C 25/138* (2006.01)
(52) U.S. Cl. ..................................... 157/1.28; 157/1.24
(58) Field of Classification Search .......... 157/1.2–1.28
See application file for complete search history.

(56) References Cited

U.S. PATENT DOCUMENTS 6,527,032 B2 * 3/2003 Corghi ....................... 157/1.28

FOREIGN PATENT DOCUMENTS

| DE | 24 16 668 A1 | 11/1974 |
|---|---|---|
| EP | 1 157 860 A | 11/2001 |
| EP | 1 743 782 A | 1/2007 |

OTHER PUBLICATIONS

European Search Report received Apr. 17, 2008.

* cited by examiner

*Primary Examiner*—D. S Meislin
(74) *Attorney, Agent, or Firm*—Browdy and Neimark, PLLC

(57) ABSTRACT

A tire mounting/dismounting machine (1), comprising a base (2), rotating means (3) for supporting and blocking a wheel (100) and a column (4) associated to the base (2), a first arm (7) and a second arm (8) being slidably mounted on the column (4), an upper first debeader tool (13) and a lower second debeader tool (9) being mounted respective at free ends of each arm (7, 8). Mounted at the free end of the first arm (7) is a head (10) which is rotatable with respect to an axis (Y), from which head a mounting tool (11), a dismounting tool (12) and the first debeader tool (13) project, the tools (11, 12, 13) being mounted in reciprocal positions such that the tools (11, 12, 13) do not interfere with one another and such that by rotating the head (10) with respect to the first arm (7) a same work position can be reached for each of the tools (11, 12, 13). Means for blocking (14, 15, 16, 17) are associated to the head (10) in three different positions, a same work position for each of the tools (11, 12, 13) corresponding to each of the three different positions.

14 Claims, 4 Drawing Sheets

TYRE MOUNTING/DISMOUNTING MACHINE

BACKGROUND OF THE INVENTION

The present invention relates to a machine for mounting and dismounting tyres.

In order to perform a tyre dismounting and a following mounting operation off and on a wheel, the prior art comprises machines which include a self-centring device which enables the wheel to be blocked and to set it in rotation with respect to an axis, which in the majority of cases is a vertical axis, in proximity of which device there is a pair of debeader tools, an upper tool and a lower tool, arranged symmetrically with respect to the horizontal plane of symmetry of the wheel, and a second vertical column along which a dismounting tool can slide, as well as a mounting tool, both being associated to a relative work arm.

In the prior art, in order to perform the dismounting of the tyre from the wheel, the wheel is fixed on a self-centring device and blocked thereto. At this point debeader tools are first applied, by translating the first column; the debeaders are positioned in contact with a point of the two opposite circular edges of the tyres (beads) in order to push them internally of the rim, from which the beads then detach. Once the debeading operation is done, the debeaded tyre is removed from the rim (to which it is still associated). This operation is performed by using the dismounting tool located on the second column, which column is neared by translating to the wheel on the self-centring device. In this case too, the dismounting tool, which bears a hook at an end thereof, is brought close to the wheel into a position such that it can be inserted between the edge of the rim and the bead of the tyre up until it hooks the tyre, which is then extracted by completely detaching the tyre from the rim of the wheel itself.

In order to perform a mounting operation of a new tyre on the same rim, a mounting tool is used, also located on the second column, which consists in a bar which is brought into proximity of the bead of the new tyre, previously placed around the rim, to push it internally of the rim to which it must attach. All of these operations are performed while the wheel rotates on the self-centring device.

In order to operate correctly, in each of the above-described operations, i.e. the debeading, dismounting and mounting, the wheel and the tool to be used must time by time be in a reciprocal position such as to enable contact in a point located in proximity of the bead and thus the circular edge of the rim. The described known machines exhibit some drawbacks and disadvantages. Each time the three described operations are performed on a same wheel, the wheel and the tool under use have to be located in a reciprocal position such as to guarantee a correct performing of the work and since the tools are borne on two columns, both columns have to be moved so that the reciprocal position between the wheel and the tool used is the same each time.

Further, the presence of two columns limits the movement and vision of the operator in proximity of the zone in which the machine operates on the wheel, creating relative awkwardness and obstacles in relation to the freedom of movement of the operator himself.

BRIEF SUMMARY OF THE INVENTION

The present invention therefore provides a tyre mounting/dismounting machine which enables the performance of debeading, dismounting and mounting to be performed on a same wheel in a way which is simpler and faster with respect to the machines in the prior art; the foregoing is attained in the ambit of a constructional solution which is more economical and at the same able to offer a considerable level of flexibility of use with wheels of any type and size.

The aim of the present invention is to provide a tyre mounting/dismounting machine having structural and functional characteristics such as to satisfy the above-mentioned requirements and at the same time to obviate the drawbacks outlined with respect to the prior art.

The aim is attained by a tyre mounting/dismounting machine that comprises a base; rotating means for supporting and blocking a wheel; a column associated to the base; a first arm and a second arm slidably mounted on the column; an upper first debeader tool and a lower second debeader tool being mounted respectively at free ends of each arm. A head, which is mounted at the free end of the first arm, is rotatable with respect to an axis. A mounting tool, a dismounting tool and the first debeader tool project from the head. The tools at the free end of the first arm are mounted in reciprocal positions such that they do not interfere with one another and such that by rotating the head with respect to the first arm a same work position can be reached for each of the tools at the free end of the first arm. The tyre mounting/dismounting machine also comprises means for blocking that are associated to the head in three different positions, wherein each of the three different positions are corresponding to a work position for each of the tools at the free end of the first arm.

BRIEF DESCRIPTION OF THE SEVERAL VIEWS OF THE DRAWING(S)

The dependent claims delineate preferred and particularly advantageous embodiments of the tyre mounting/dismounting machine of the invention. Further characteristics and advantages of the invention will emerge from a reading of the following description, provided by way of non-limiting example, with the aid of the figures of the accompanying drawings, in which:

DETAILED DESCRIPTION OF THE INVENTION

Figure 1:
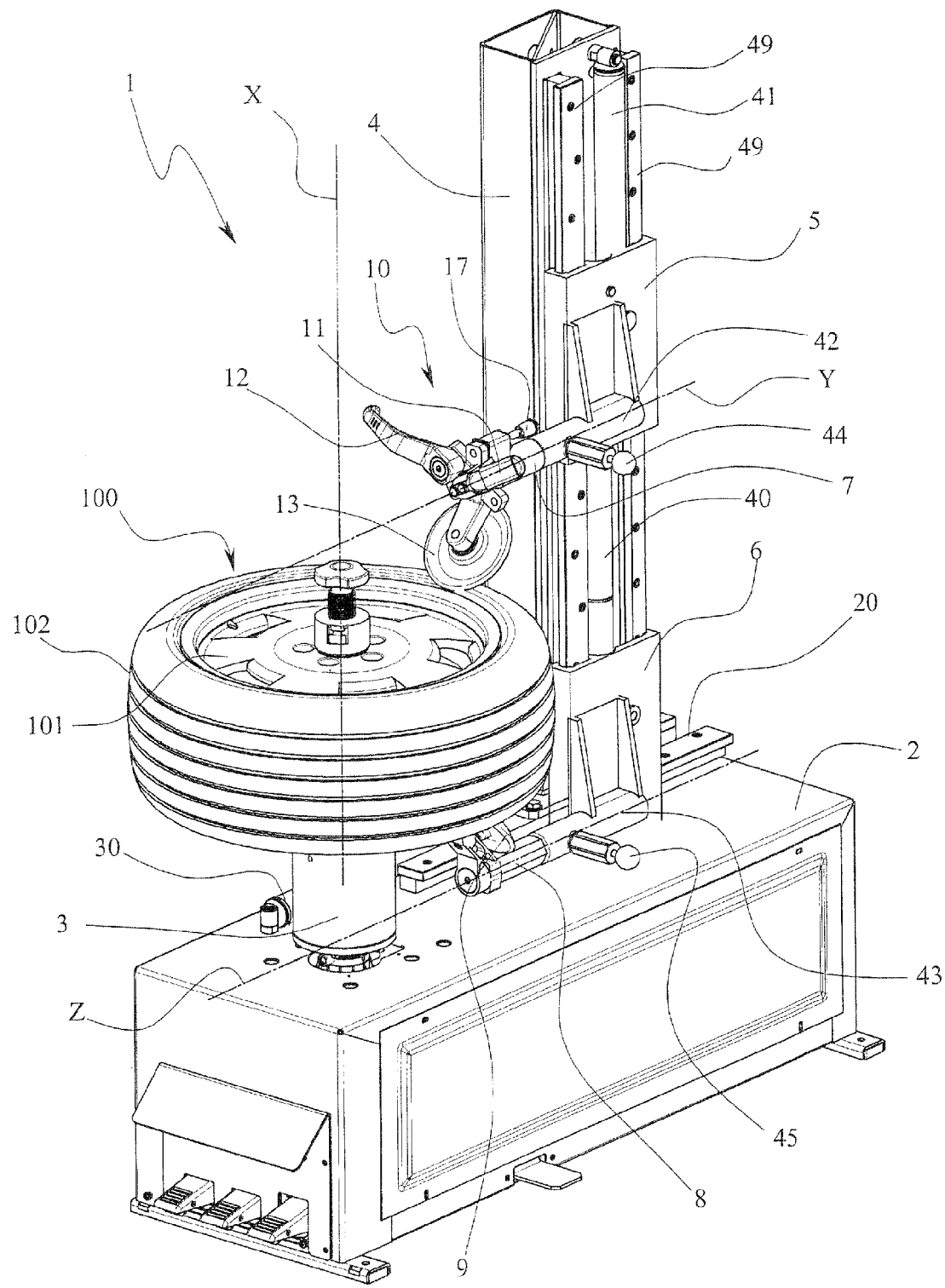
FIG. 1 is a perspective view of a tyre mounting/dismounting machine of the present invention.
Figure 2:
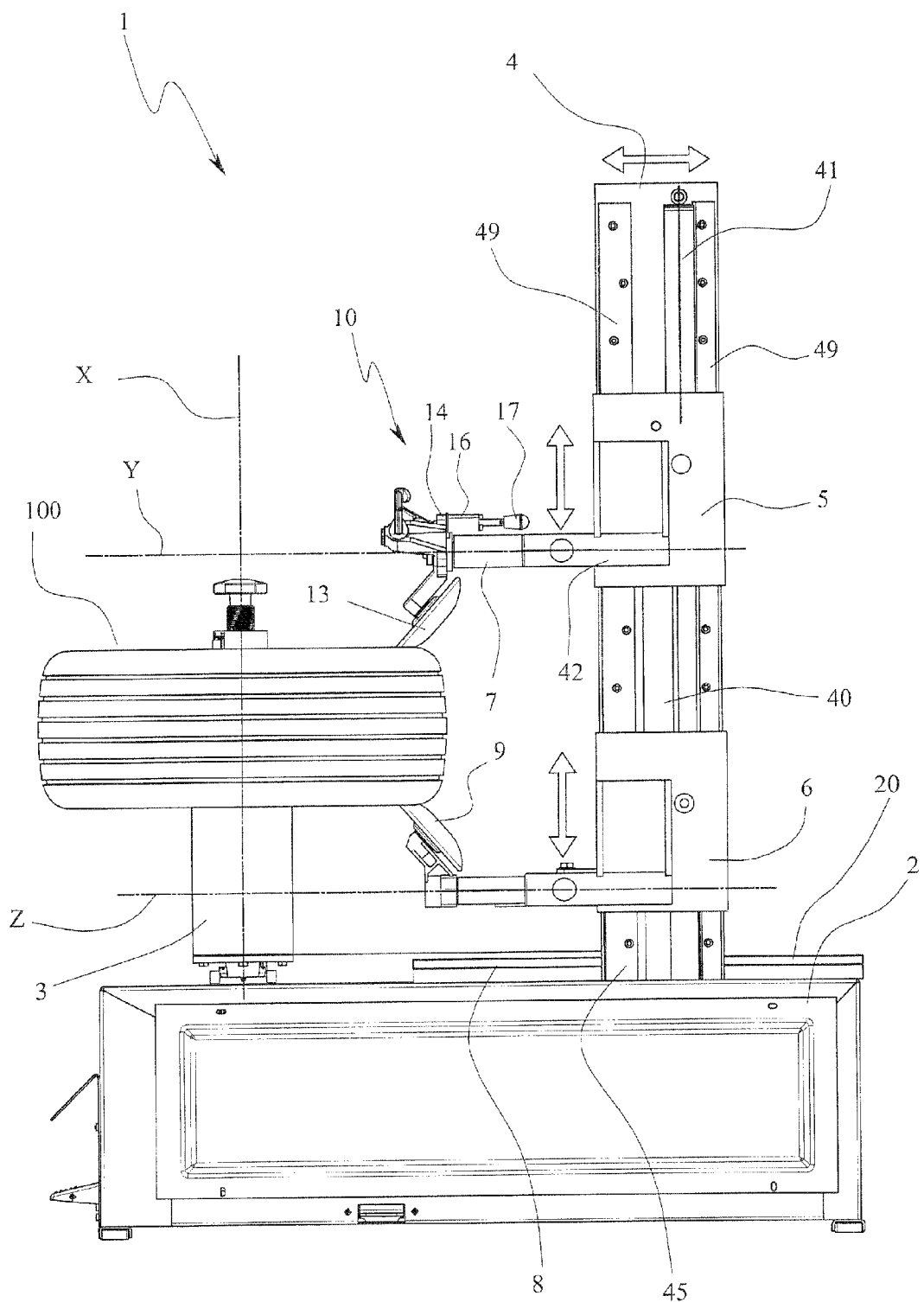
FIG. 2 is a lateral view of the machine of FIG. 1.

With reference to FIGS. 1 and 2, 1 denotes in its entirety a tyre mounting/dismounting machine in agreement with the present invention. The machine 1 comprises, in general terms, a base 2 to which rotating wheel support and blocking means 3 are associated (the wheel comprising a rim 101 and a tyre 102), a column 4 on which a first and a second slide, the first an upper slide 5 and the second a lower slide 6, can move, the slides respectively supporting a first and a second arm, denoted by 7 and 8. A debeading tool 9 is fixed to the free end of the second arm 8.

In the present invention, a head 10 is rotatably mounted to the free end of the first arm 7; a mounting tool 11, a dismounting tool 12 and a debeading tool 13 are supported on the head 10.

A more detailed description of the head 10 will be provided herein below. In the illustrated example of the invention, the base 2 exhibits a parallelepiped conformation from an upper plane of which the rotating support and blocking means 3 project, which are constituted by a self-centring device, of known type and therefore not described in detail, which is vertically arranged and set in rotation by means of usual activating means housed internally of the base 2, and rotating about a fixed vertical axis, denoted by X.

The column 4, arranged vertically and parallel to the axis X, is slidingly mounted at a distance from and by the side of the self-centring device 3.

The column 4 is coupled to the base 2 such as to be translatable with a sliding motion which enables work to be performed on wheels 100 having different diameters as well as facilitating the fastening and removal of the wheel itself from the self-centring device 3.

In the example, the lower end of the column 4 is shaped such as to realise a mechanical constraint which enables sliding only on a guide 20 fixed on the plane of the base 2; the column 4 can be neared or distanced from the self-centring device 3 by sliding on the guide 20.

The sliding of the whole column 4 on the guide 20 is achieved by activating a jack 30 located on the base 2 and fixed on a side thereof to the column 4 and on another side thereof to the base 2 itself.

The sliding of the slides 5, 6 is done on two rails 49 which are parallel to one another and to the longitudinal axis of the column, and are mounted on a flank of the column; the sliding is performed by activation of a respective jack is 40, 41 located between the two rails 49 on the column itself.

A sleeve 42, 43 extends from each slide 5, 6, which sleeve 42, 43 is fixed to the respective slide 5, 6. The arms 7, 8 are inserted into the sleeve 42, 43, the arms 7, 8 being maintained in a fixed position by a lock bolt 44, 45 inserted in a hole afforded on the respective sleeve 42, 43.

The two arms 7, 8 are arranged horizontally and lie on a common vertical plane substantially passing through the rotation axis X.

In the present invention the head 10 is rotatably mounted at the free end of the first arm 7 and is free to rotate about an axis Y (in particular coinciding with the longitudinal axis of the arm 7) which crosses the axis X perpendicularly.

Figure 3:
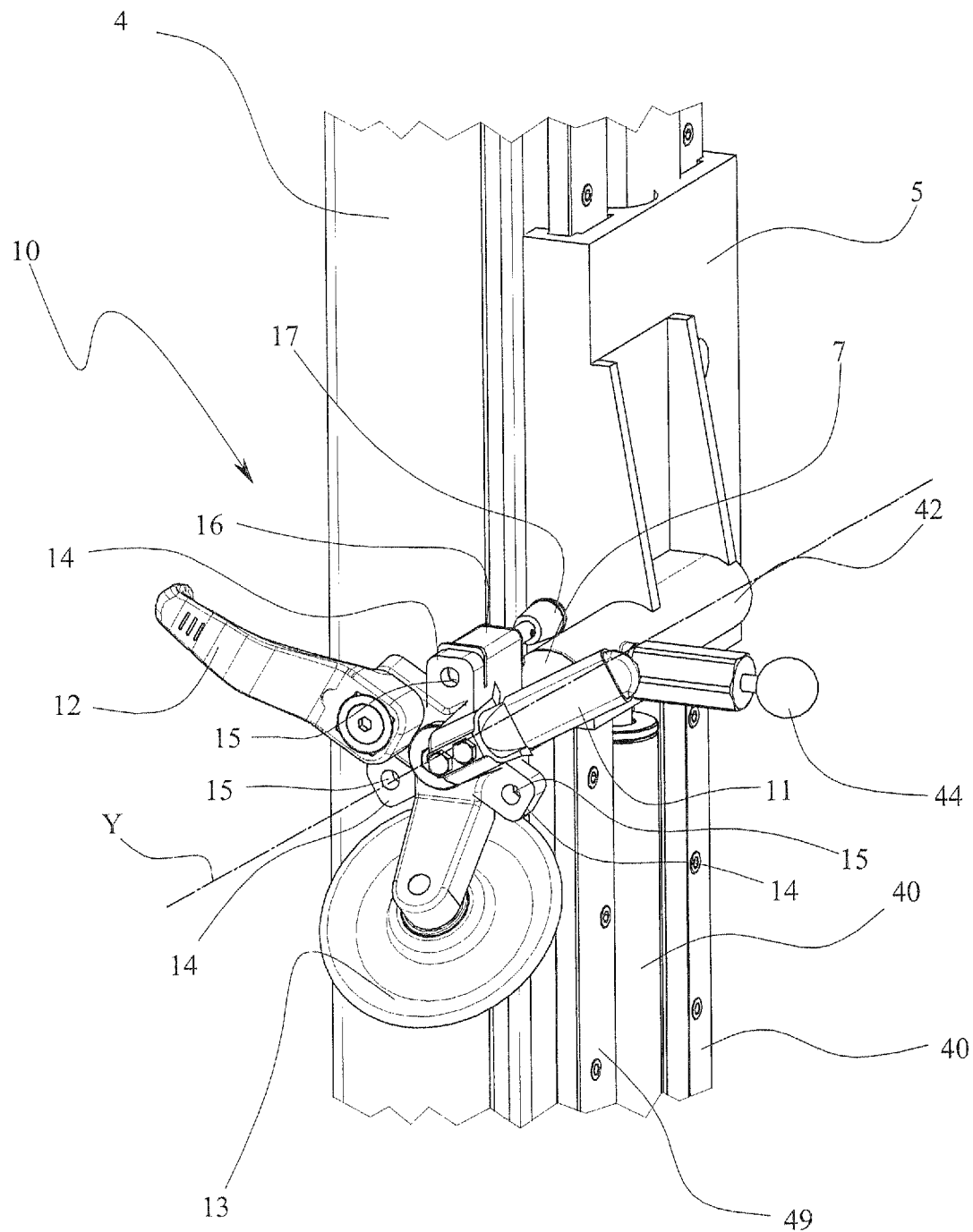
FIG. 3 is an enlarged view of a detail of FIG. 1.
Figure 4:
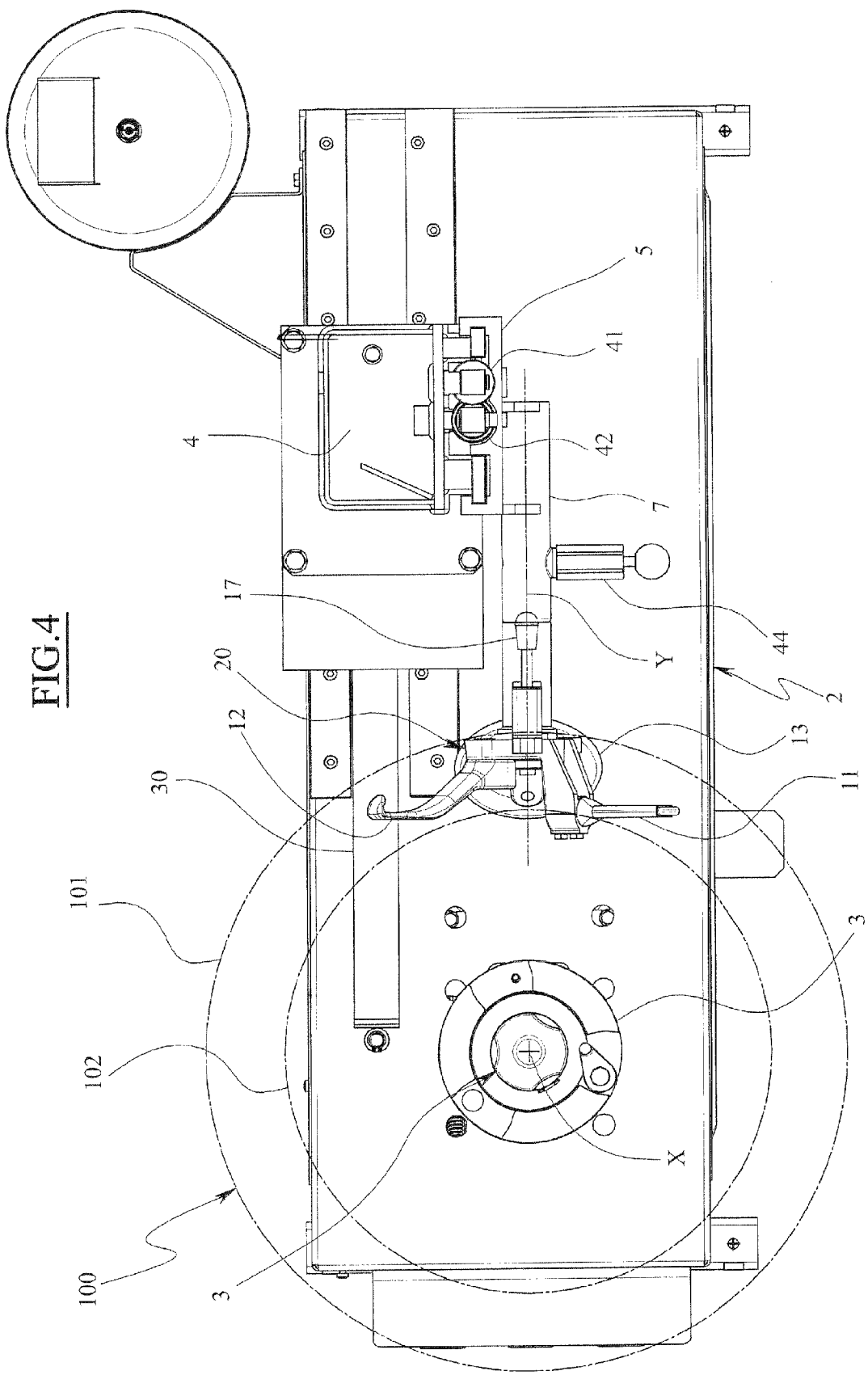
FIG. 4 is a plan view from above of FIG. 1.

As can be seen in FIG. 3, the longitudinal axis Z of the lower arm 8 also crosses the axis X perpendicularly.

The head 10 is defined by a body on which the three tools 11, 12, 13 are fixed and are reciprocally mounted such that they do not interfere with one another; in particular, the tools 11, 12, 13 are equidistant, being arranged radially at 120° from each other.

The angular position of the head 10 with respect to the axis Y is blocked by special blocking means which in the present example are three radial appendages 14 interposed between the tools 11, 12, 13 and each provided with a through-hole 15 which is placed correspondingly to a further single hole, not visible in the figures, afforded in a block 16 fixed to the first arm 7 in order to be crossed by a blocking bolt 17.

For the purposes of the present invention, the three angular positions in which the head 10 can be blocked in rotation, by means of the bolt 17 passed through the hole of the block 16 and one of the holes 15 of the three appendages 14, must correspond to three positions with respect to the wheel in which the three tools 11, 12, 13 borne on the head 10 can be used.

Further, a work position for each tool 11, 12, 13 must correspond to each of the three positions, the work position being such as to be able to work on a same wheel without having to find the correct work position for the tyre debeading, dismounting and mounting operations.

In other words, the free end of each tool 11, 12, 13 which has to cooperate with the tyre is always placed in the same position with respect to the wheel, simply by rotating the head 10 and blocking the position reached with the bolt 17.

Naturally the size of the holes 15 and the bolt 17 are preferably realised such as to prevent any oscillation of the head 10.

The tools 11, 12, 13 used for performing the operations of debeading, mounting and dismounting are of known type.

In particular, the debeader tools 13 and 9 are each formed by a circular body which is rotatably mounted respectively on the head 10 and on the free end of the lower arm 8, such as to rotate idle with respect to an axis passing through the centre of each tool 13 and 9.

The circular bodies of the debeader tools 13, 9 exhibit a concavity which in the work position faces the self-centring device 3.

In order to perform the debeading optimally, as known in the sector, the debeader tools 13, 9 exhibit a fixed inclination such as to facilitate the insertion thereof between the edge of the rim 101 and the bead of the tyre 102.

Naturally when the head 10 is blocked such as to have the debeader tool 13 in the work position, the debeader tool 13 assumes a symmetrical configuration to the other debeader tool 9 located on the lower arm 8 with respect to a perpendicular plane to the axis X of rotation of the wheel, which in the example is horizontally located.

The mounting tool 11 is formed by a bar fastened at an end thereof to the head 10 by means of two screws.

The dismounting tool 12 is formed by a fixed oblong body by means of a screw to an end of the head 10 and exhibits, at a free end thereof, a hooked conformation.

To replace a tyre of a wheel the following operations must be carried out. Firstly, the wheel 100 is blocked on the self-centring device 3 in a known way. At this point, the debeading is performed by means of the two debeaders 9, 13, of which the upper debeader tool 13 has been placed in the work position, while the lower debeader tool 9 is constantly in the work position. The column 4 is neared to the wheel 100 by activating the jack 30 up until the column 4 reaches the correct position, which is determined by the position reached by the debeader tools 9, 13 with respect to the edge of the rim 101 of the wheel.

The two jacks 40 and 41 are activated to bring the two debeader tools 13, 9 against the opposite beads of the tyre 102 of the wheel 100. Once they are in contact with the tyre, the wheel 100 is rotated by the self-centring device 3, enabling the two debeader tools 9, 13 to detach the bead from the edge of the rim 101, as in the prior art. When the debeading operation has been completed, the two debeader tools 9, 13 are distanced from the wheel, causing the two slides 5, 6 to slide along the column 4. Thereafter, after unblocking by sliding the bolt 17 out from the hole 15 of the appendage 14, the head 10 is rotated to bring the dismounting tool 12 into the position which was previously occupied by the debeader tool 13; this new position, which is the work position, is newly blocked by inserting the bolt 17 into the hole 15 of the appendage 14 which moves into a position at the block 16.

At this point the upper slide 5 (which bears the head) is neared to the wheel 100 by activating the jack 40. The dismounting tool 12 is perfectly in position to work, i.e. at the same position where previously the debeader tool 13 was located, without there being any need to newly determine the correct work position, as it coincides with the previously-determined position.

As is known, the hooked part will in practice be interposed between the edge of the rim 101 and the bead of the tyre 102, entering the rim; once hooked on the bead the tyre 102 will be extracted from the rim, enabling the tyre 102 to be completely removed.

Thereafter, still following known practices, the tyre 102 is removed from the rim 101, possibly with the aid of the lower debeader tool 9 and/or the same dismounting tool 13.

After the tyre 102 has been extracted, a new tyre is placed on the rim 101, and is associated to the rim 101 using known methods, in particular with the use of the mounting tool 11 brought into the work position, simply by rotating the head 10 by 120° in the same way as previously described.

In order to have greater freedom of movement the column 4 can be distanced from the wheel 100, then to be returned into the same position between one operation and another; in particular after having extracted the bead from the rim 101 the column 4 can be distanced in order to facilitate the removal operations of the tyre 102 and its subsequent replacement. In this case it will be sufficient to return the column 4 into the previous position. This task can be facilitated by controlling the machine from a central control system which via an electronic program controls the functioning of the jack 30, as well as the further organs of movement of the machine 1.

Though explicit reference has been made herein to a machine in which the self-centring device 3 and the column 4 are both arranged vertically, it is possible to adapt the solution of the present invention with the elements arranged differently, in particular with them both horizontally oriented.

Further, although in the illustrated embodiment of the figures the axis along which the first arm 7 extends bearing the head 10 is perpendicular to the rotation axis X, this position can be different as long as the rotation axis Y of the head 10 intersects or almost intersects the rotation axis X.

As can be appreciated from the foregoing description, the tyre mounting/dismounting machine of the present invention satisfies the needs and obviates the drawbacks outlined in the introductory part of the present description, with reference to the prior art.

The machine of the present invention enables the debeading, mounting and dismounting operations to be performed on a same wheel by simply rotating the head radially bearing the three tools, without there being any need to find the correct position for each of the three tools.

Obviously an expert in the sector, with the intention of satisfying contingent and specific requirements, might make numerous modifications and variations to the tyre mounting/dismounting machine as described herein, all of which are contained in the ambit of protection sought for the invention, as defined in the following claims.

The invention claimed is:

1. A tyre mounting/dismounting machine (1), comprising:
   a base (2);
   rotating means (3) for supporting and blocking a wheel (100);
   a column (4) associated to the base (2);
   a first arm (7) and a second arm (8) slidably mounted on the column (4);
   an upper first debeader tool (13) and a lower second debeader tool (9) being mounted respectively at free ends of each arm (7, 8),
      wherein a head (10) is mounted at the free end of the first arm (7), and is rotatable with respect to an axis (Y),
      wherein a mounting tool (11), a dismounting tool (12) and the first debeader tool (13) project from the head (10) and are mounted in reciprocal positions such that they (11, 12, 13) do not interfere with one another and such that by rotating the head (10) with respect to the first arm (7) a same work position can be reached for each of the tools (11, 12, 13) projected from the head (10);
   means for blocking (14, 15, 16, 17) being associated to the head (10) in three different positions, wherein each of the three different positions are corresponding to a work position for each of the tools (11, 12, 13) projected from the head (10).

2. The machine (1) of claim 1, wherein the column (4) is movable in directions toward and away from the rotating means (3) for supporting and blocking the wheel (100).

3. The machine (1) of claim 2, wherein the motion of the column (4) is activated by means of a jack (30) housed on the base (2).

4. The machine (1) of claim 1, wherein the first arm (7) and the second arm (8) are activated to slide along the column (4) by means of a first jack (40) and a second jack (41) associated to the column (4).

5. The machine of claim 1, wherein the first arm (7) and the second arm (8) are respectively fixed to a slide (5, 6) and each slide (5, 6) is slidable along rails (49) fixed to the column (4).

6. The machine (1) of claim 1, wherein the axis (Y) about which the head (10) rotates is arranged to substantially cross a rotation axis (X) of the means (3) for supporting and blocking the wheel (100).

7. The machine (1) of claim 6, wherein the rotation axis (Y) of the head (10) is arranged perpendicular with respect to the rotation axis (X) of the means (3) for supporting and blocking the wheel (100).

8. The machine (1) of claim 1, wherein the tools (11, 12, 13) projected from the head (10) are arranged radially at a step of 120° from one another.

9. The machine (1) of claim 1, wherein the first debeader tool (13) is formed by a circular body rotatably mounted on the head (10) such as to rotate idly with respect to an axis passing through a centre thereof, the circular body exhibiting a concavity facing towards the means (3) for supporting and blocking the wheel (100).

10. The machine (1) of claim 1, wherein the mounting tool (11) is formed by a bar fixed at an end thereof to the head (10).

11. The machine (1) of claim 1, wherein the dismounting tool (12) is formed by an oblong body fixed at an end thereof to the head (10) and exhibiting at a free end thereof a hook conformation.

12. The machine of claim 1, wherein the means for blocking comprise three radial appendages (14) which extend from the head (10) and are interposed between the tools (11, 12, 13) projected from the head (10), each appendage (14) is provided with a through-hole (15) which locates at a further hole afforded in the block (16) fixed to the first arm (7) in order to be crossed by a blocking bolt (17).

13. The machine (1) of claim 1, wherein the column (4) is vertically arranged.

14. The machine (1) of claim 1, wherein the first debeader tool (13) and the second debeader tool (9) are symmetrically mounted with respect to one another on a plane which is perpendicular to a rotation axis (X) of the means (3) for supporting and blocking the wheel (100).

* * * * *